United States Patent
Sharifi Tehrani et al.

(10) Patent No.: US 12,530,127 B2
(45) Date of Patent: Jan. 20, 2026

(54) TEMPERATURE PROFILE TRACKING FOR ADAPTIVE DATA INTEGRITY SCAN RATE IN A MEMORY DEVICE

(71) Applicant: Micron Technology, Inc., Boise, ID (US)

(72) Inventors: Saeed Sharifi Tehrani, San Diego, CA (US); Christopher M. Smitchger, Garden City, ID (US)

(73) Assignee: Micron Technology, Inc., Boise, ID (US)

( * ) Notice: Subject to any disclaimer, the term of this patent is extended or adjusted under 35 U.S.C. 154(b) by 10 days.

(21) Appl. No.: 17/580,498

(22) Filed: Jan. 20, 2022

(65) Prior Publication Data

US 2023/0229317 A1 Jul. 20, 2023

(51) Int. Cl.
*G06F 11/00* (2006.01)
*G06F 3/06* (2006.01)
*G06F 11/30* (2006.01)

(52) U.S. Cl.
CPC .......... *G06F 3/0619* (2013.01); *G06F 3/0653* (2013.01); *G06F 3/0679* (2013.01); *G06F 11/3037* (2013.01); *G06F 11/3058* (2013.01)

(58) Field of Classification Search
CPC ... G06F 11/3058; G06F 3/0619; G06F 3/0653
See application file for complete search history.

(56) References Cited

U.S. PATENT DOCUMENTS

| | | | |
|---|---|---|---|
| 11,099,038 B2 * | 8/2021 | Geboers | G01K 1/022 |
| 2021/0073066 A1 * | 3/2021 | Bielby | G06F 11/0739 |
| 2021/0263821 A1 * | 8/2021 | Yang | G11C 29/021 |
| 2022/0070181 A1 * | 3/2022 | Liu | H04L 63/1416 |
| 2022/0237094 A1 * | 7/2022 | Sheperek | G06F 3/0679 |
| 2023/0229317 A1 * | 7/2023 | Sharifi | G06F 3/0653 |
| | | | 711/103 |

* cited by examiner

*Primary Examiner* — Philip Guyton
(74) *Attorney, Agent, or Firm* — Greenberg Traurig

(57) ABSTRACT

Systems, methods, and apparatus related to controlling media scan in memory devices. In one approach, a controller manages a media scanning process for a memory (e.g., NAND flash memory) as a function of temperature. The controller collects temperature data from one or more sensors of the memory. Using the collected temperature data, the controller determines a moving average temperature. Based on the moving average temperature, the controller updates a frequency of the media scanning process.

23 Claims, 7 Drawing Sheets

| Input Parameter Name | Comments |
|---|---|
| MS_TEMP_SAMPLE_FREQ | In minutes. Frequency of Sampling Current Operating Temperature. |
| MS_NUM_TEMP_SAMPLES | Number of Temperature Samples used in FIFO Fashion to Calculate Average Operating Temperature. |
| MS_TEMP_UPDATE_ITER | Number of Iterations. It Controls when Scan Frequency Parameters Get Updated based on Average Temperature. |

FIG. 5

TEMPERATURE PROFILE TRACKING FOR ADAPTIVE DATA INTEGRITY SCAN RATE IN A MEMORY DEVICE

FIELD OF THE TECHNOLOGY

At least some embodiments disclosed herein relate to memory systems in general, and more particularly, but not limited to memory systems configured to control a data integrity scan (also referred to as media scan) process for a memory.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The embodiments are illustrated by way of example and not limitation in the figures of the accompanying drawings in which like references indicate similar elements.

FIG. 5 shows parameters used in the media scan management process of FIG. 4.

DETAILED DESCRIPTION

Figure 1:
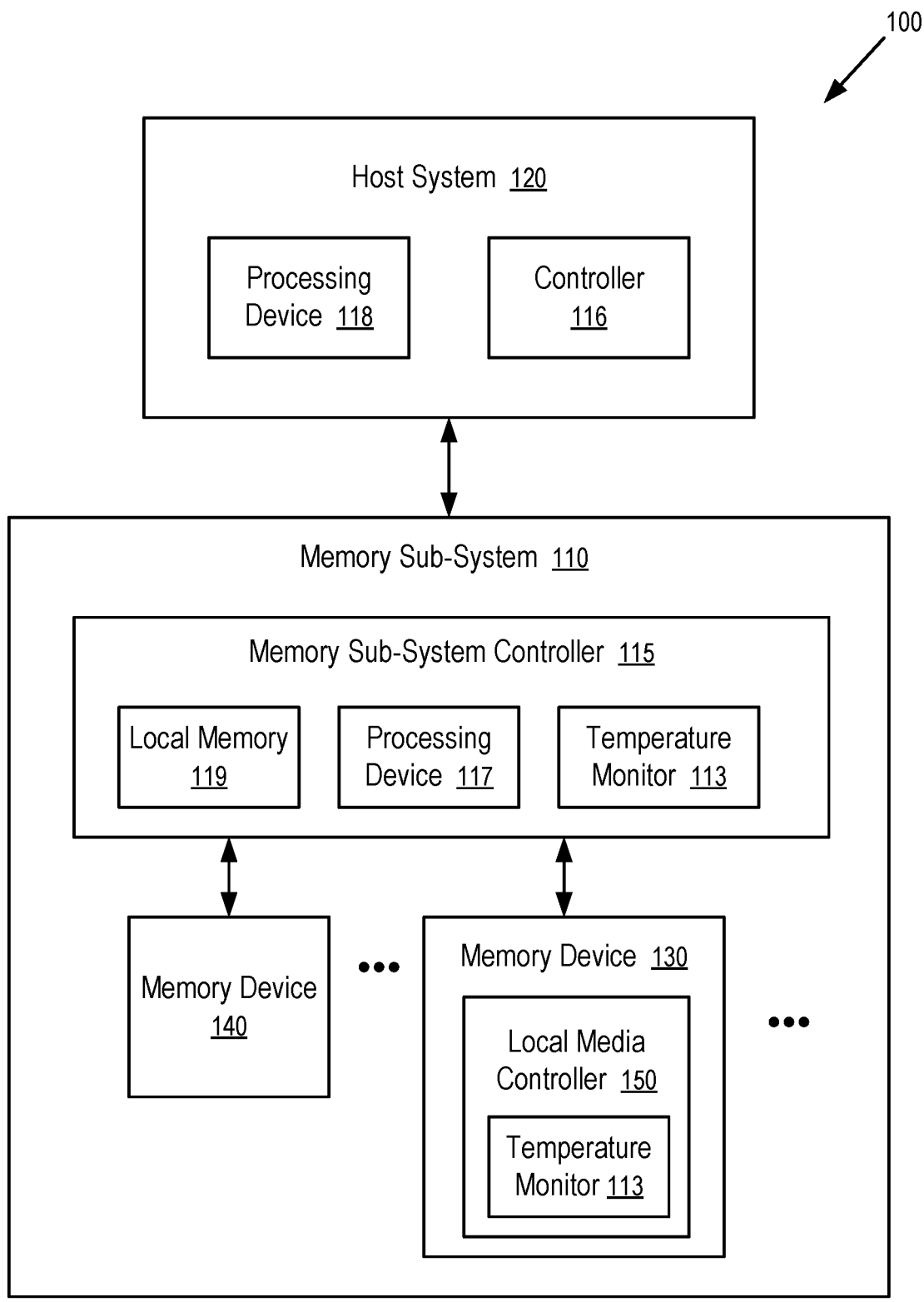
FIG. 1 illustrates an example computing system having a memory sub-system in accordance with some embodiments of the present disclosure.

At least some aspects of the present disclosure are directed to a memory sub-system configured to monitor temperatures associated with a memory to control a memory media scan process. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

Storage devices such as solid-state drives (SSDs) use a media scan algorithm to monitor the health of data stored in the SSD. The media scan periodically samples data in the SSD at particular frequencies (e.g., once every 5-120 seconds, or once every 2-60 minutes). If stored data has degraded, or another criticality associated with the stored data or the SSD is identified, then the data is refreshed. For example, this refresh can be done by copying the data to a new location, which refreshes it.

Various different mechanisms can negatively impact the quality of data stored in an SSD. One of these mechanisms is data retention. For example, after data has been written, and a period of time has passed after writing the data, a controller attempts to read the data. However, the data may have degraded if it has not been refreshed in a sufficiently short time after writing.

In addition to passage of time, data retention is also a function of temperature. For example, the higher the temperature at which data is stored, the more accelerated the rate of degradation of the stored data. Prior devices do not manage media scan based on temperature. Instead, prior devices only manage media scan based on passage of time. However, in some cases of more elevated temperature, stored data will degrade quickly and be lost before a rigidly-fixed period of time may have passed, as is used in prior devices. Thus, a controller may fail to refresh stored data before it is lost because the controller waited an arbitrarily-fixed period of time prior to performing a media scan. This creates the technical problem of memory failure, and/or failure of a process being executed by the controller and/or a host device using data stored in the memory.

At least some aspects of the present disclosure address the above and other deficiencies by controlling media scan as a function of temperature. In one embodiment, the temperature used is an average temperature over a period of time (e.g., a moving average based on 32 temperature samples). For example, the time period corresponds to a time that data has been stored (e.g., 2 hours or 2 days since writing the data). For example, a controller assesses whether to perform a media scan of the data to check data integrity. The frequency at which the controller performs a media scan for all or a portion of data stored in a memory can be based on the moving average temperature.

Data retention for stored data is a function of the temperature at which the data has been stored. The present disclosure uses one or more sensors to obtain data regarding temperatures associated with a memory. A moving average temperature is used because a single, instantaneous temperature (e.g., a current operating temperature) is not reflective of the physical conditions under which data may have been stored over a period of time. For example, the current temperature may be colder (e.g., less than 5 degrees Celsius), but the data may have been stored at a hotter temperature (e.g., greater than 40-50 degrees Celsius) for several hours, days, or even months. The current temperature does not indicate this extended storage condition.

In one embodiment, a controller changes a frequency at which a media scan (sometimes called an integrity scan) is performed as a function of temperature. The controller obtains data indicating a typical operating temperature of the system over a time period (e.g., an average temperature over the prior 60 minutes or 12 hours).

Use of the average temperature, for example, avoids the problem of prior systems that only report an instantaneous temperature. The single, instantaneous temperature is not directly usable for controlling media scan because media scan needs to rely on or be based on, for example, the bake/retention temperature conditions associated with data storage, rather than rapidly-changing instantaneous temperatures. If a media scan algorithm were to adjust its frequency based on instantaneous temperatures, the frequency would rapidly fluctuate. But the frequency would not reflect storage conditions. Thus, temperatures at different points in time are used to control media scan frequency, as described below.

Also, changing media scan frequency too rapidly can affect the quality of service provided by a memory device to a host device. Smoothing temperature data over time typically minimizes this problem.

In one embodiment, a system includes memory (e.g., a flash storage media), and at least one sensor (e.g., a sensor embedded in the memory) configured to collect data regarding temperatures associated with the memory. The system further includes at least one processing device (e.g., a memory controller on a same chip with the memory) configured to manage media scanning for the memory. The controller receives collected data from the sensor, and determines, using the collected data, an average temperature. The controller updates, based on the average temperature, a frequency of the media scanning. The memory can be volatile and/or non-volatile memory.

Products using adjustment of media scan as described above can include, for example, various types of memory devices such as two or three-dimensional NAND flash memory devices (e.g., as used in solid-state drives), and three dimensional cross-point memory devices. The memory devices can include both volatile (e.g., DRAM) and non-volatile memory. These memory devices can be used, for example, in a vehicle, mobile device, cloud device used in a cloud infrastructure or network, server, laptop, or gaming console.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or such a computing device that includes memory and a processing device.

The computing system 100 can include a host system 120 that is coupled to one or more memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset (e.g., processing device 118) and a software stack executed by the processor chipset. The processor chipset can include one or more cores, one or more caches, a memory controller (e.g., controller 116) (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, a universal serial bus (USB) interface, a Fibre Channel, a Serial Attached SCSI (SAS) interface, a double data rate (DDR) memory bus interface, a Small Computer System Interface (SCSI), a dual in-line memory module (DIMM) interface (e.g., DIMM socket interface that supports Double Data Rate (DDR)), an Open NAND Flash Interface (ONFI), a Double Data Rate (DDR) interface, a Low Power Double Data Rate (LPDDR) interface, or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The processing device 118 of the host system 120 can be, for example, a microprocessor, a central processing unit (CPU), a processing core of a processor, an execution unit, etc. In some instances, the controller 116 can be referred to as a memory controller, a memory management unit, and/or an initiator. In one example, the controller 116 controls the communications over a bus coupled between the host system 120 and the memory sub-system 110. In general, the controller 116 can send commands or requests to the memory sub-system 110 for desired access to memory devices 130, 140. The controller 116 can further include interface circuitry to communicate with the memory sub-system 110. The interface circuitry can convert responses received from memory sub-system 110 into information for the host system 120.

The controller 116 of the host system 120 can communicate with controller 115 of the memory sub-system 110 to perform operations such as reading data, writing data, or erasing data at the memory devices 130, 140 and other such operations. In some instances, the controller 116 is integrated within the same package of the processing device 118. In other instances, the controller 116 is separate from the package of the processing device 118. The controller 116 and/or the processing device 118 can include hardware such as one or more integrated circuits (ICs) and/or discrete components, a buffer memory, a cache memory, or a combination thereof. The controller 116 and/or the processing device 118 can be a microcontroller, special purpose logic circuitry (e.g., a field programmable gate array (FPGA), an application specific integrated circuit (ASIC), etc.), or another suitable processor.

The memory devices 130, 140 can include any combination of the different types of non-volatile memory components and/or volatile memory components. The volatile memory devices (e.g., memory device 140) can be, but are not limited to, random access memory (RAM), such as dynamic random access memory (DRAM) and synchronous dynamic random access memory (SDRAM).

Some examples of non-volatile memory components include a negative-and (or, NOT AND) (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs, or any combination of such. In some embodiments, a particular memory device can include an SLC portion, an MLC portion, a TLC portion, a QLC portion, and/or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory devices such as 3D cross-point type and NAND type memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EE-PROM).

A memory sub-system controller 115 (or controller 115 for simplicity) can communicate with the memory devices 130 to perform operations such as reading data, writing data, or erasing data at the memory devices 130 and other such operations (e.g., in response to commands scheduled on a command bus by controller 116). The controller 115 can include hardware such as one or more integrated circuits (ICs) and/or discrete components, a buffer memory, or a combination thereof. The hardware can include digital circuitry with dedicated (i.e., hard-coded) logic to perform the operations described herein. The controller 115 can be a microcontroller, special purpose logic circuitry (e.g., a field programmable gate array (FPGA), an application specific integrated circuit (ASIC), etc.), or another suitable processor.

The controller 115 can include a processing device 117 (processor) configured to execute instructions stored in a local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 does not include a controller 115, and can instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory devices 130. The controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory devices 130.

In some embodiments, the memory devices 130 include local media controllers 150 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 150) for media management within the same memory device package. An example of a managed memory device is a managed NAND (MNAND) device.

The controller 115 and/or a memory device 130 can include a temperature monitor 113 configured to monitor temperatures for controlling a media scan process (e.g., a media scan of NAND flash storage media in memory device 130). In some embodiments, the controller 115 in the memory sub-system 110 includes at least a portion of the temperature monitor 113. In other embodiments, or in combination, the controller 116 and/or the processing device 118 in the host system 120 includes at least a portion of the temperature monitor 113. For example, the controller 115, the controller 116, and/or the processing device 118 can include logic circuitry implementing the temperature monitor 113. For example, the controller 115, or the processing device 118 (processor) of the host system 120, can be configured to execute instructions stored in memory for performing the operations of the temperature monitor 113 described herein. In some embodiments, the temperature monitor 113 is implemented in an integrated circuit chip disposed in the memory sub-system 110. In other embodiments, the temperature monitor 113 can be part of firmware of the memory sub-system 110, an operating system of the host system 120, a device driver, or an application, or any combination therein.

For example, the temperature monitor 113 implemented in the controller 115 can manage a media scan process for a memory device (e.g., a flash storage media of memory device 130; or DRAM in memory device 140). Data is collected from one or more temperature sensors (not shown in FIG. 1; see, e.g., FIG. 2) by controller 115. The collected sensor data represents temperatures associated with the memory device.

After the controller 115 receives the collected data from the sensors, controller 115 determines, using the collected data, an average temperature (e.g., a moving average calculated from collected temperature data over the last 60 minutes using 60 samples). The controller 115 updates, based on the average temperature, a frequency of the media scan process.

Figure 2:
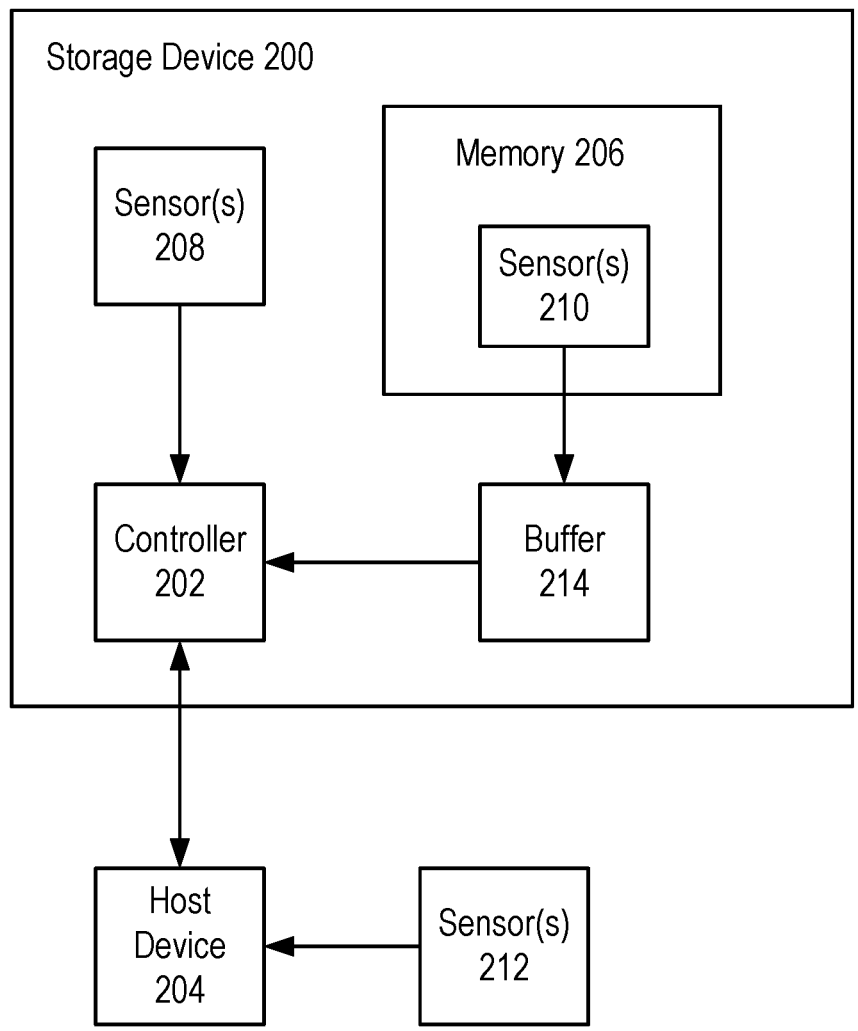
FIG. 2 shows a storage device configured to adjust a frequency of media scan for a memory, according to one embodiment.

FIG. 2 shows a storage device 200 configured to adjust a frequency of media scan for a memory 206, according to one embodiment. In one example, storage device 200 is a solid-state drive. Storage device 200 is an example of memory sub-system 110. Memory 206 is an example of memory device 130 or 140. Controller 202 is an example of controller 115.

Controller 202 manages data collected by one or more sensors 208 and/or one or more sensors 210. For example, sensors 210 are on a same chip as memory 206. For example, sensors 208 are on a different chip from memory 206. For example, sensors 208 and controller 202 are on the same chip.

In one example, data collected by sensors 210 is stored in buffer 214. In one example, buffer 214 is first-in first-out (FIFO) buffer. Data collected by sensors 208 may be stored in buffer 214 and/or a different buffer (not shown).

In one embodiment, controller 202 causes one or more of sensors 208, 210 to collect temperature data at regular periodic time intervals. For example, temperature data can be collected every 60 seconds by one or more of the sensors. The collected data can be stored in buffer 214 and/or other buffers.

In one embodiment, as time passes during operation, temperature data collected at several time intervals accumulates in buffer 214. Controller 202 uses the collected temperature data in buffer 214 to calculate a moving average. For example, controller 202 can be configured to calculate the moving average once a selected number (e.g., 30-120) of temperature data samples have been collected. In one example, the moving average is determined after 60 samples are collected. Then, the moving average is re-calculated as each new sample is collected. In one example, a new moving average is calculated each 60 seconds when temperature data samples are collected each 60 seconds.

Controller 202 is configured to manage a media scan process for memory 206. For example, the media scan process may be performed at a frequency of once every 60 minutes. After calculating the new moving average from collected temperature data, controller 202 updates a frequency of the media scan process. In one example, the frequency may be increased to perform the media scan process every 30 minutes. For example, the frequency may be increased if the moving average temperature has significantly increased, which corresponds to a higher risk of data loss due to poor data retention at the elevated temperatures experienced by the memory 206.

In one example, the updated frequency is determined by controller 202 using a lookup table. The moving average is an input to the lookup table. In one example, the updated frequency is computed by controller 202 in real-time as a function of the moving average.

In one embodiment, controller 202 can configure the number of temperature samples to be stored in buffer 214 (e.g., a FIFO buffer) during monitoring. Additionally and/or alternatively, controller 202 can configure the time interval at which each temperature data sample is taken. In one example, controller 202 configures a collection time interval for each of sensors 208 and 210.

Figure 4:
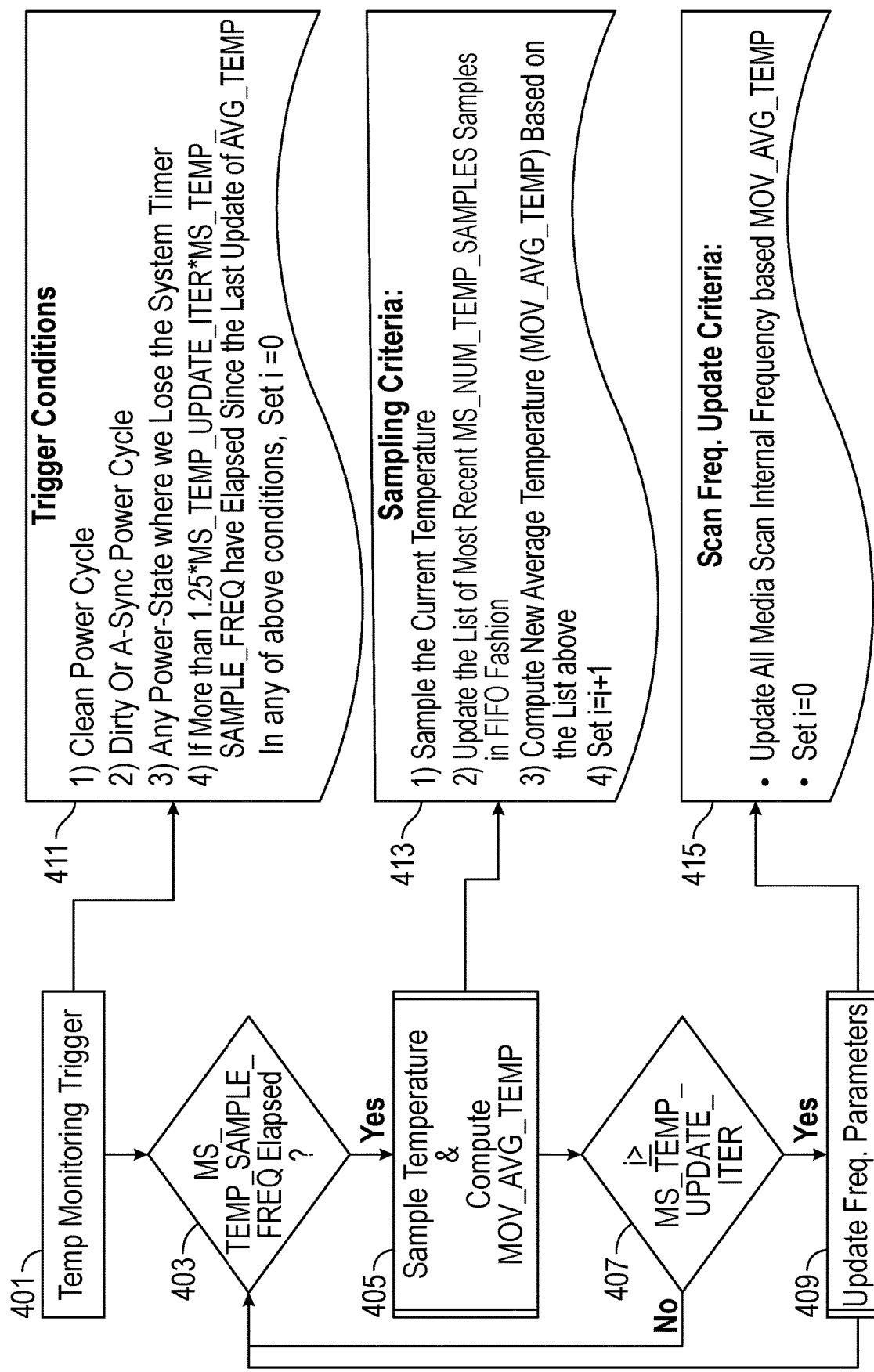
FIG. 4 shows a media scan management process based on temperature monitoring, according to one embodiment.

In one embodiment, controller 202 starts or resets a temperature monitoring process (see, e.g., the temperature monitoring of the media scan management process in FIG. 4) that collects data from sensors 208, 210 based on determining whether a triggering event has occurred. In response to determining that the triggering event has occurred, controller 202 starts or resets the temperature monitoring process. Examples of triggering events include detection of an anomaly in a power supply, or the loss of a timer used by controller 202 for determining time intervals and/or other use in other functions. In one example, the triggering event is the passage of a predetermined time since the last determination by controller 202 of a moving average temperature.

In one embodiment, host device 204 uses storage device 200 for storing data used by one or more applications that execute on host device 204. In one embodiment, data collected by one or more sensors 212 is provided to controller 202. In one example, sensors 212 collect data associated with a temperature of an environment in which storage device 200 is operating (e.g., under the hood of a vehicle with a gasoline-powered engine). The updated frequency determined by controller 202 can be based at least in part on data collected by sensors 212.

In one embodiment, controller 202 updates the frequency for media scanning using the moving average temperature as an input to a machine learning model (not shown). For example, the machine learning model is an artificial neural network. The frequency is provided as an output from the machine learning model. In one example, data collected from sensors 208 and sensors 210 is used as inputs to the machine learning model. In one example, other inputs to the machine learning model can be used such as inputs related to a context of operation of memory 206, storage device 200, and/or host device 204. In one example, data collected by sensors 212 can also be used as an input to the machine learning model.

In one example, controller 202 uses the 32 most recently-collected temperature samples in buffer 214 to calculate a moving average. The moving average is used as an input to a lookup table to obtain a new frequency. Controller 202 uses this new frequency to update how often memory 206 is monitored and/or sampled using a media scan process managed by controller 202.

In one embodiment, controller 202 considers the type of storage device 200 and/or a context of operation of storage device 200 when updating the frequency. For example, for some types of memory devices, it is desired that the frequency of media scan not be changed too rapidly. For example, the controller 202 can tune the frequency for different types of memory devices such as memory devices used in vehicles, mobile devices, or cloud servers. The frequency tuning characteristics can be implemented by controller 202 differently for each type of memory device.

In one embodiment, controller 202 collects operational data associated with the performance of memory 206. For example, this operational data may include data retention characteristics (e.g., error rates), and/or read/write performance characteristics such as access time or programming time. Controller 202 may use such collected operational data as input(s) for determining an updated frequency. In one example, this operational data is provided as input(s) to the machine learning model above.

Figure 3:
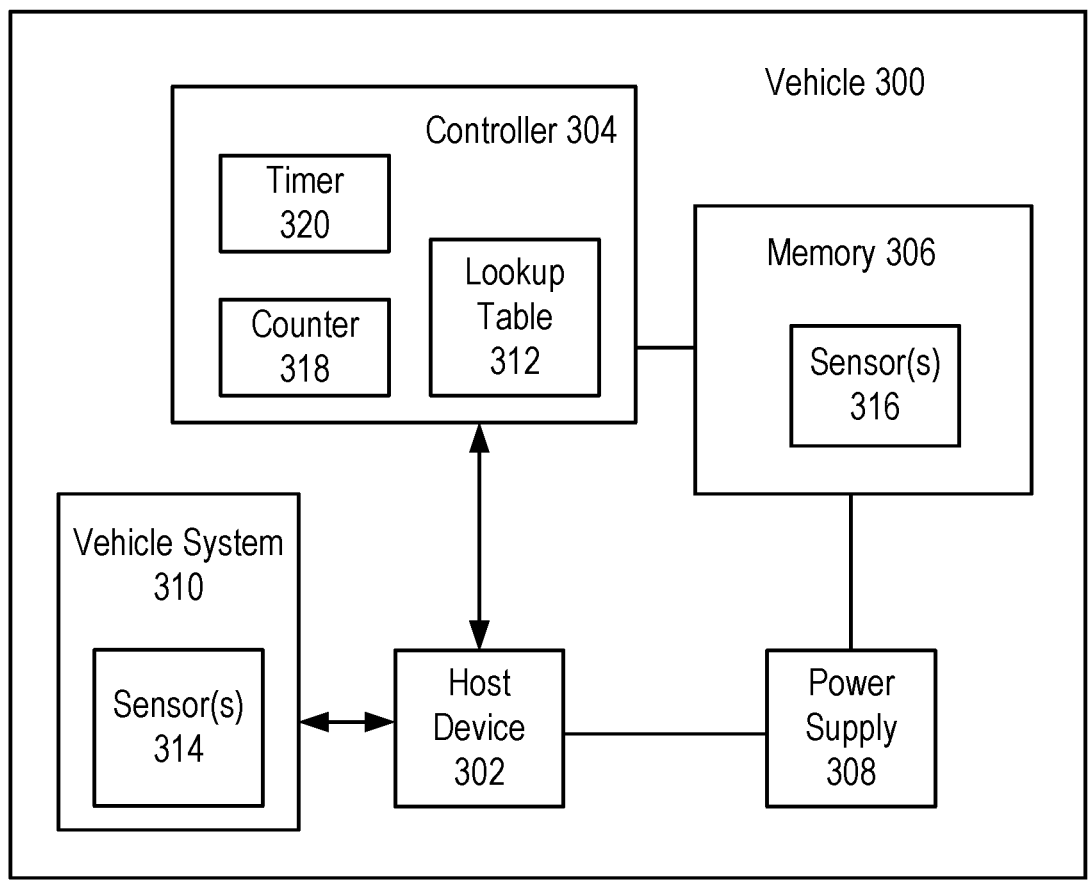
FIG. 3 shows a vehicle including a controller that manages media scan for a memory based on temperature monitoring, according to one embodiment.

FIG. 3 shows a vehicle 300 including a controller 304 that manages media scan for a memory 306 based on temperature monitoring, according to one embodiment. Host device 302 communicates with controller 304 (e.g., by sending read and write commands). Controller 304 manages storage of data in memory 306 for use by host device 302.

Memory 306 is an example of memory 206. Controller 304 is an example of controller 202. Host device 302 is an example of host system 120.

Sensors 316 are associated with memory 306. Sensors 316 (e.g., embedded temperature sensors in a three-dimensional memory array) can be implemented using, for example, sensors 208, 210, and/or 212. Sensors 316 collect data that indicates one or more temperatures of memory 306. Controller 304 receives this data from sensors 316. In one example, controller 304 stores the collected data in the buffer (e.g., buffer 214).

Controller 304 includes a timer 320 and a counter 318. Timer 320 is used to determine when a time interval has passed, and it is time to collect another temperature data sample from sensors 316. Counter 318 used to count a number of samples that are collected at, for example, fixed time intervals. Controller 304 determines when the number of samples collected has reached a defined limit. When the limit is reached, controller 304 determines a new frequency used to update the media scan frequency for memory 306.

Controller 304 includes lookup table 312. In one embodiment, lookup table 312 is used to determine the new frequency for updating the media scan.

Host device 302 controls one or more vehicle systems 310. Examples of vehicle system 310 include an engine, a motor, a navigation system, a braking system, or a steering system. Vehicle system 310 includes one or more sensors 314 that collect data related to operation of the vehicle system 310. Data collected from sensors 314 can be stored by host device 302 in memory 306. Host device 302 sends write commands to controller 304 when storing such data.

In one embodiment, data from sensors 314 can be used as an input to a machine learning model used by controller 304 to determine a new media scan frequency. Other inputs to the machine learning model include temperature data from sensors 316 and/or other data relating to an operational context of vehicle system 310 and/or vehicle 300. In one example, controller 304 selects the new media scan frequency at least in part based on an operational context of vehicle system 310 as determined by data from sensors 314 and/or other data from host device 302.

Host device 302 and/or memory 306 receive power from a power supply 308 of vehicle 300. Temperature monitoring for managing media scan of memory 306 can be triggered based on controller 304 detecting a change in operation of power supply 308 (e.g., a power supply characteristic that exceeds a threshold). In one example, a supply voltage from power supply 308 falls below a threshold value. This triggers the start or reset of the temperature monitoring by controller 304 (see, e.g., block 411 of FIG. 4).

In one example, a trigger condition that starts or resets temperature monitoring includes a clean power cycle in which power is turned off, and then power is turned back on. In one example, a trigger condition is a dirty or asynchronous power cycle in which power is lost or is anomalous.

In one example, for updating frequency parameters, a precomputed lookup table 312 can be used. When memory 306 is a NAND memory, the lookup table can be based on the NAND characteristics of the cells in the memory. The data in the lookup table can be based on how data retention behaves as a function of temperature for the cells (e.g., as determined from experimental data, and/or determined by the controller 304). In one example, the input to the lookup table is a temperature range, and the output is the frequency to be used for media scan. In one example, controller 304 determines an input temperature range in which the calculated moving average temperature falls.

FIG. 4 shows a media scan management process based on temperature monitoring, according to one embodiment. The temperature monitoring starts or resets at block 401 in response to one or more trigger conditions that occur (block 411). When the monitoring starts or is reset, a counter i is set equal to zero. In one example, the temperature monitoring is performed by controller 202 or 304. In one example, the counter i is tracked using counter 318.

In one example, as shown in step 4 of block 411, a fixed experimental coefficient equal to 1.25 is used. It should be noted that this is a non-limiting example, and that the value used for the coefficient can vary (e.g., as desired for design reasons). Also, the coefficient can be made configurable.

The temperature monitoring is performed to track a moving average temperature of the system over a desired period of time. The monitoring is configurable and its behavior can be adjusted based on requirements of different SSD categories. Because the monitoring process tracks the moving average over a period of time, its output is not noisy and represents the average bake temperature that NAND or other memory cells have experienced over that period of time.

FIG. 5 shows parameters used in the media scan management process of FIG. 4. The temperature monitoring is used in media scan in, for example, an SSD to adjust frequency based on temperature, as described herein.

A controller can tune the media scan frequency updating by configuring the iteration parameter MS_TEMP_UPDATE_ITER. For example, as the iteration parameter is increased, the rate of how often the memory device is changing the media scan frequency decreases.

The process of FIG. 4 generally operates as follows:

At block 403, the process samples system temperature at every "MS_TEMP_SAMPLE_FREQ" time interval. In one example, the time interval is tracked by timer 320.

At block 405, the process keeps the most recent "MS_NUM_TEMP_SAMPLES" number of samples in a list (e.g., in a FIFO fashion in buffer 214).

At block 405, the process averages all samples currently in the FIFO list to update the moving average (MOV_AVG_TEMP). The counter i is incremented by one (block 413).

At block 407, the controller determines whether a predetermined number of iterations "MS_TEMP_UPDATE_ITER" has been reached.

At block 409, when the predetermined number of iterations "MS_TEMP_UPDATE_ITER" is reached, the process uses MOV_AVG_TEMP to update a frequency of media scan. The counter i is then set to zero (block 415). The process then returns to block 403 to sample another system temperature.

In one example of the general process above, if MS_TEMP_UPDATE_ITER=1, MS_TEMP_SAMPLE_FREQ=2 minutes, and MS_NUM_TEMP_SAMPLES=32, then the moving average temperature (MOV_AVG_TEMP) is updated every 2 minutes based on the average of the last 32 temperature samples. These samples have been obtained over the prior 2 min×32=64 minutes.

In one embodiment, after a power cycle (e.g., in which power is lost), MOV_AVG_TEMP output is reset to a fixed or nominal operating temperature until a sufficient number of MS_NUM_TEMP_SAMPLES temperatures are sampled and an updated MOV_AVG_TEMP is available.

For example, all 32 samples in the FIFO buffer can be set to the fixed or nominal operating temperature. In an alternative approach, the sample temperatures can be saved in a non-volatile memory, and then reused on restart.

Figure 6:
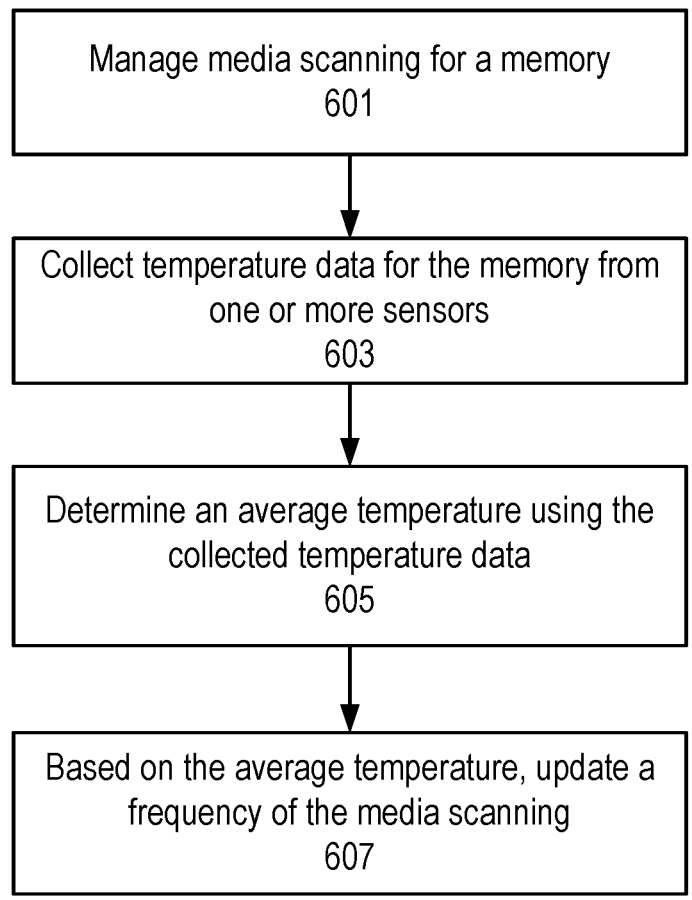
FIG. 6 shows a method to monitor temperatures associated with a memory to control a media scan process, according to one embodiment.

FIG. 6 shows a method to monitor temperatures associated with a memory to control a media scan process (e.g., to update a frequency of media scan as in FIG. 4), according to one embodiment. The method of FIG. 6 can be performed by processing logic that can include hardware (e.g., processing device, circuitry, dedicated logic, programmable logic, microcode, hardware of a device, integrated circuit, etc.), software/firmware (e.g., instructions run or executed on a processing device), or a combination thereof. In some embodiments, the method of FIG. 6 is performed at least in part by controller 115 of FIG. 1, controller 202 of FIG. 2, or controller 304 of FIG. 3. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

For example, the method of FIG. 6 can be implemented in a computing system of FIG. 1 with temperature monitor 113, as illustrated in FIGS. 2-5.

At block 601 of the method, media scanning for a memory is managed. In one example, controller 202 manages media scanning for memory 206.

At block 603, temperature data for the memory is collected from one or more sensors. In one example, temperature data is collected from sensors 208 and/or 210.

At block 605, an average temperature is determined using the collected temperature data. In one example, controller 202 uses temperature data samples stored in buffer 214 to determine a moving average temperature of memory 206.

At block 607, a frequency of the media scanning is updated based on the average temperature. In one example, controller 202 uses the moving average temperature as an input to a lookup table, machine learning model, and/or a mathematical function to determine a new frequency. The frequency of the media scanning is updated based on the determined new frequency. In one example, the lookup table is lookup table 312.

In one embodiment, a non-transitory computer storage medium can be used to store instructions of the firmware of a memory sub-system (e.g., 110). When the instructions are executed by the controller 115 and/or the processing device 117, the instructions cause the controller 115, the processing device 117, and/or a separate hardware module to perform the methods discussed above.

In one embodiment, a system comprises: memory (e.g., 206, 306); at least one sensor (e.g., 208, 210, 212, 316) configured to collect data regarding temperatures associated with the memory; and at least one processing device (e.g., 115, 150, 202, 304) configured to: manage media scanning for the memory; receive the collected data from the sensor; determine, using the collected data, an average; and update, based on the average, a frequency (e.g., block 409 of FIG. 4) of the media scanning.

In one embodiment, the memory is at least one of volatile (e.g., DRAM) or non-volatile memory (e.g., NAND flash memory).

In one embodiment, the average is a moving average of a plurality of temperatures determined using the collected data.

In one embodiment, the collected data includes a number of temperature samples, each sample collected at time intervals determined by the processing device.

In one embodiment, the temperatures are stored in a buffer (e.g., 214), and an earliest temperature is removed from the buffer when the buffer is full and a new temperature is added to the buffer.

In one embodiment, the processing device is further configured to control a number of temperature samples that are stored in the buffer.

In one embodiment, updating the frequency comprises using the average to select the frequency from a lookup table (e.g., 312). The lookup table includes a plurality of frequencies corresponding to respective temperature ranges, and the average is compared to the temperature ranges to select the frequency.

In one embodiment, updating the frequency comprises computing the frequency as a function of the average.

In one embodiment, the memory is NAND memory configured in a solid-state drive.

In one embodiment, the processing device is further configured to control at least one physical component (e.g., vehicle system 310) of a vehicle (e.g., 300), and the sensor (e.g., 314, 316) is mounted in the vehicle.

In one embodiment, the sensor is integrated into the memory.

In one embodiment, the memory stores data used by the processing device, and the memory and processing device are configured in a mobile device, cloud device, server, laptop, or gaming console.

In one embodiment, the memory, the sensor, and the processing device are encapsulated in a package.

In one embodiment, the processing device is further configured to: increment a counter (e.g., 318) each time that a sample temperature is determined using the collected data; and determine whether the counter has reached a threshold. The frequency is updated in response to determining that the counter has reached the threshold.

In one embodiment, an apparatus comprises: non-volatile memory; and at least one processing device configured to: control media scanning for the non-volatile memory; determine a plurality of temperatures of the non-volatile memory, each respective temperature determined at fixed time intervals; determine, using the plurality of temperatures, a moving average temperature; and update, based on the moving average temperature, a frequency of the media scanning.

In one embodiment, the processing device is further configured to manage a temperature monitoring process that includes determining the moving average temperature; determine whether a triggering event (e.g., one or more trigger conditions of block 411 in FIG. 4) has occurred; and in response to determining that the triggering event has occurred, start or reset the temperature monitoring process.

In one embodiment, the triggering event is a power cycling in which a supply of power to the non-volatile memory ends and then resumes.

In one embodiment, the triggering event is detection of an anomaly in a power supply.

In one embodiment, the triggering event is a loss of a timer (e.g., 320), or the passage of a predetermined time since a last determination by the processing device of a moving average temperature.

In one embodiment, the triggering event is a first triggering event (e.g., initial powering-up of a computing device), and the processing device is further configured to: determine whether a second triggering event (e.g., after the initial powering-up, loss of power by the computing device during operation) has occurred; and in response to determining that the second triggering event has occurred, reset the temperature monitoring process.

In one embodiment, in response to resetting the temperature monitoring process, the moving average temperature is set to a predetermined value (e.g., a fixed or nominal temperature) until a minimum number of new temperatures of the non-volatile memory are determined.

In one embodiment, a method comprises: determining a fixed number of temperatures of a non-volatile memory over a fixed time period; determining, using the temperatures, a moving average temperature; and updating, based on the moving average temperature, a frequency of media scanning for the non-volatile memory.

In one embodiment, updating the frequency comprises using the moving average temperature as an input to a machine learning model (e.g., an artificial neural network) to obtain a frequency as an output. In one example, machine learning model is trained using operational data collected by controller 202 during operation of storage device 200. In one example, the operational data relates to data retention characteristics determined for memory cells of memory 206. In one example, the data retention characteristics are used by controller 202 when selecting a frequency for updating media scanning of memory 206. In one example, the frequency of media scan is different for different portions of a memory device or array, based on historical data retention as determined by controller 202.

In one embodiment, the temperatures are determined by collecting data from at least one sensor (e.g., 210, 316) of the non-volatile memory.

Figure 7:
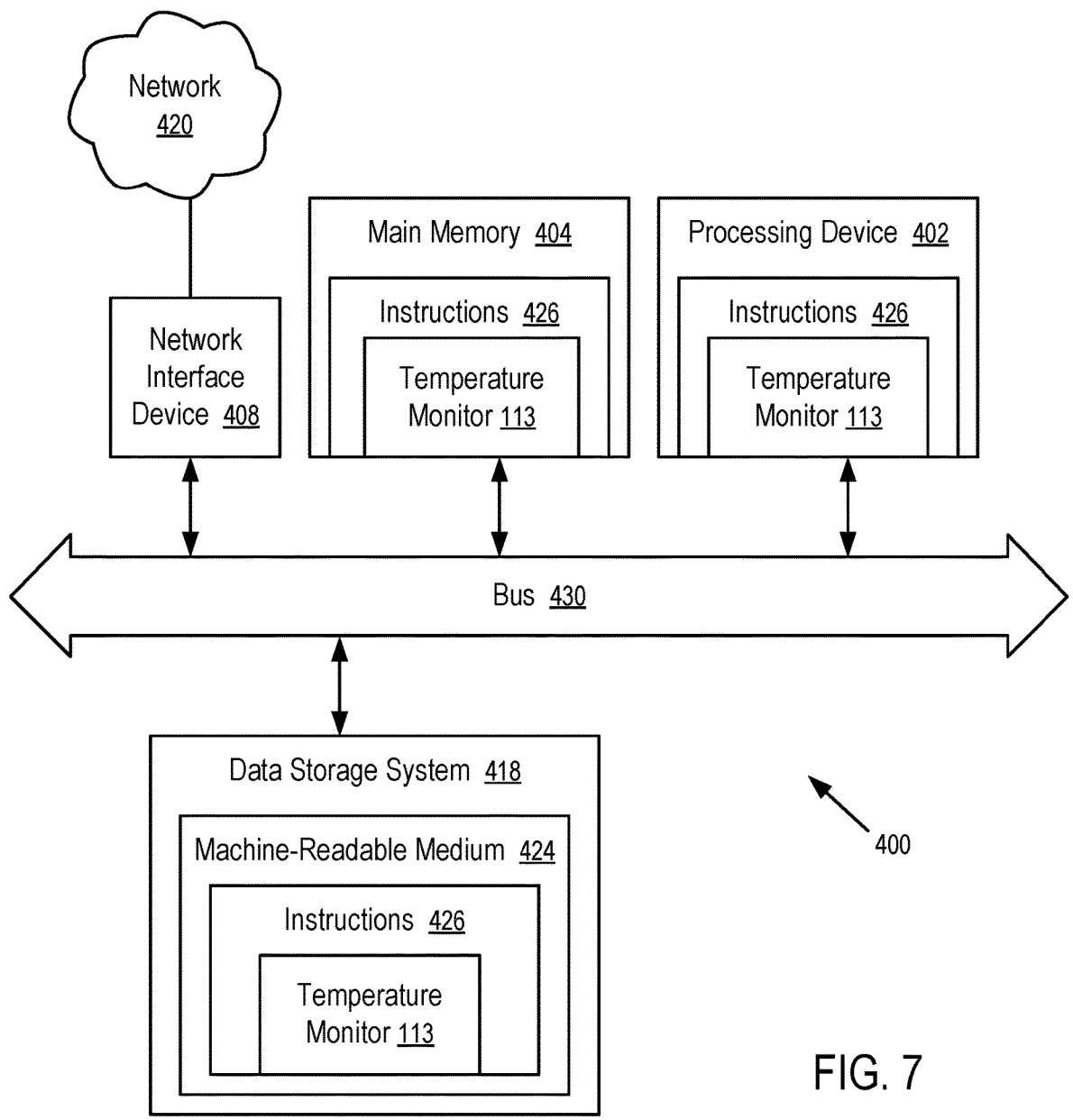
FIG. 7 is a block diagram of an example computer system in which embodiments of the present disclosure can operate.

FIG. 7 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 1) that includes, is coupled to, or utilizes a memory sub-system (e.g., the memory sub-system 110 of FIG. 1) or can be used to perform the operations of temperature monitor 113 (e.g., to execute instructions to perform operations corresponding to the temperature monitor 113 described with reference to FIGS. 1-6). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), static random access memory (SRAM), etc.), and a data storage system 418, which communicate with each other via a bus 430 (which can include multiple buses).

Processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable storage medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 418, and/or main memory 404 can correspond to the memory sub-system 110 of FIG. 1.

In one embodiment, the instructions 426 include instructions to implement functionality corresponding to a temperature monitor 113 (e.g., the temperature monitor 113 described with reference to FIGS. 1-6). While the machine-readable storage medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
    memory;
    at least one sensor configured to collect data regarding temperatures associated with the memory; and
    at least one processing device configured to:
        receive the collected data from the sensor;
        determine, using the collected data, an average;
        update, based on the average, media scanning for the memory;
        increment a counter each time that a sample temperature is determined using the collected data; and
        determine whether the counter has reached a threshold;
        wherein a frequency of the media scanning is updated in response to determining that the counter has reached the threshold.

2. The system of claim 1, wherein the memory is at least one of volatile or non-volatile memory.

3. The system of claim 1, wherein the average is a moving average of a plurality of temperatures determined using the collected data.

4. The system of claim 3, wherein the collected data includes a number of temperature samples, each sample collected at time intervals determined by the processing device.

5. The system of claim 3, wherein the temperatures are stored in a buffer, and an earliest temperature is removed from the buffer when the buffer is full and a new temperature is added to the buffer.

6. The system of claim 5, wherein the processing device is further configured to control a number of temperature samples that are stored in the buffer.

7. The system of claim 1, wherein:
    updating the media scanning comprises using the average to select a frequency from a lookup table; and
    the lookup table includes a plurality of frequencies corresponding to respective temperature ranges, and the average is compared to the temperature ranges to select the frequency.

8. The system of claim 1, wherein updating the media scanning comprises computing a frequency as a function of the average.

9. The system of claim 1, wherein the memory is NAND memory configured in a solid-state drive.

10. The system of claim 1, wherein the sensor is integrated into the memory.

11. The system of claim 1, wherein the processing device is further configured to control at least one physical component of a vehicle, and the sensor is mounted in the vehicle.

12. The system of claim 1, wherein the memory stores data used by the processing device, and the memory and processing device are configured in a mobile device, cloud device, server, laptop, or gaming console.

13. The system of claim 1, wherein the memory, the sensor, and the processing device are encapsulated in a package.

14. An apparatus comprising:
non-volatile memory; and
at least one processing device configured to:
  determine a plurality of temperatures of the non-volatile memory;
  determine, using the plurality of temperatures, an average temperature;
  update, based on the average temperature, a characteristic of media scanning;
  determine whether a triggering event has occurred; and
  in response to determining that the triggering event has occurred, start a temperature monitoring process;
  wherein the triggering event is a power cycling in which a supply of power to the non-volatile memory ends and then resumes.

15. The apparatus of claim 14, wherein the average temperature is a moving average temperature, and the processing device is further configured to:
  manage a temperature monitoring process that includes determining the moving average temperature.

16. The apparatus of claim 15, wherein the triggering event is detection of an anomaly in a power supply.

17. The apparatus of claim 15, wherein the triggering event is a loss of a timer, or passage of a predetermined time since a last determination by the processing device of a moving average temperature.

18. The apparatus of claim 15, wherein the triggering event is a first triggering event, and the processing device is further configured to:
  determine whether a second triggering event has occurred; and
  in response to determining that the second triggering event has occurred, reset the temperature monitoring process.

19. The apparatus of claim 18, wherein in response to resetting the temperature monitoring process, the moving average temperature is set to a predetermined value until a minimum number of new temperatures of the non-volatile memory are determined.

20. A method comprising:
  determining temperatures of a non-volatile memory;
  determining, using the temperatures, an average temperature;
  updating, based on the average temperature, media scanning for the non-volatile memory;
  determining whether a triggering event has occurred; and
  in response to determining that the triggering event has occurred, starting a temperature monitoring process;
  wherein the triggering event is detection of an anomaly in a power supply.

21. The method of claim 20, wherein updating the media scanning comprises using the average temperature as an input to a machine learning model to obtain a frequency as an output.

22. The method of claim 20, wherein the temperatures are determined by collecting data from at least one sensor of the non-volatile memory.

23. An apparatus comprising:
non-volatile memory; and
at least one processing device configured to:
  determine a plurality of temperatures of the non-volatile memory;
  determine, using the plurality of temperatures, an average temperature;
  update, based on the average temperature, a characteristic of media scanning;
  determine whether a triggering event has occurred; and
  in response to determining that the triggering event has occurred, start a temperature monitoring process;
  wherein the triggering event is detection of an anomaly in a power supply.

* * * * *